(12) United States Patent
Fukuda et al.

(10) Patent No.: US 12,531,371 B2
(45) Date of Patent: Jan. 20, 2026

(54) ELECTRICAL CONNECTOR

(71) Applicant: HONDA MOTOR CO., LTD., Tokyo (JP)

(72) Inventors: Takeo Fukuda, Wako (JP); Keiichi Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 282 days.

(21) Appl. No.: 18/261,293

(22) PCT Filed: Jan. 14, 2022

(86) PCT No.: PCT/JP2022/001018
§ 371 (c)(1),
(2) Date: Jul. 13, 2023

(87) PCT Pub. No.: WO2022/154068
PCT Pub. Date: Jul. 21, 2022

(65) Prior Publication Data
US 2024/0072490 A1    Feb. 29, 2024

(30) Foreign Application Priority Data
Jan. 15, 2021  (JP) ................. 2021-005303

(51) Int. Cl.
*H01R 13/629* (2006.01)
*B60L 53/16* (2019.01)

(52) U.S. Cl.
CPC ............ *H01R 13/629* (2013.01); *B60L 53/16* (2019.02); *H01R 2201/26* (2013.01)

(58) Field of Classification Search
CPC .... H01R 13/629; H01R 2201/26; H01R 4/34; H01R 11/12; H01R 13/405; H01R 13/748; H01R 13/631; B60L 53/16; B60L 2250/16; B60L 53/80; B60K 2001/0422;
(Continued)

(56) References Cited

U.S. PATENT DOCUMENTS 3,325,771 A * 6/1967 Ruehlemann ........ H01R 12/732
439/633
5,173,063 A * 12/1992 Barkus ............... H01R 13/6453
439/633
(Continued)

FOREIGN PATENT DOCUMENTS

CN    106602337 A    4/2017
JP    59-114775 A    7/1984
(Continued)

OTHER PUBLICATIONS

Extended European Search Report dated Jun. 4, 2024 issued in corresponding European application No. 22739473.1 (11 pages).
(Continued)

*Primary Examiner* — Abdullah A Riyami
*Assistant Examiner* — Nader J Alhawamdeh
(74) *Attorney, Agent, or Firm* — Rankin, Hill & Clark LLP

(57) ABSTRACT

An electrical connector includes a base supporting electrical terminals. Guide pins are mounted on the base. Recesses recessed inward of the guide pins are formed in side walls of the guide pins. The base is embedded in the recesses. The guide pins are held on the base by the embedding.

7 Claims, 10 Drawing Sheets

(58) Field of Classification Search
CPC .... B60K 2001/0455; B60K 2001/0466; B60K 1/04; B60Y 2200/12; H01M 50/543
See application file for complete search history.

(56) References Cited

U.S. PATENT DOCUMENTS

| | | | | |
|---|---|---|---|---|
| 5,356,300 | A * | 10/1994 | Costello | H01R 12/7005 |
| | | | | 439/378 |
| 5,466,171 | A * | 11/1995 | Bixler | H01R 13/6315 |
| | | | | 439/378 |
| 5,697,799 | A * | 12/1997 | Consoli | H01R 12/73 |
| | | | | 439/910 |
| 7,892,038 | B1 * | 2/2011 | Kataoka | H01R 13/6215 |
| | | | | 439/660 |
| 2013/0090001 | A1 * | 4/2013 | Kagotani | H01R 13/60 |
| | | | | 439/378 |
| 2014/0093210 | A1 * | 4/2014 | Youngkin | G02B 6/3869 |
| | | | | 385/56 |
| 2020/0335895 | A1 * | 10/2020 | Liu | H01R 13/04 |
| 2024/0072490 | A1 * | 2/2024 | Fukuda | B60L 53/16 |

FOREIGN PATENT DOCUMENTS

| | | | |
|---|---|---|---|
| JP | 11-011761 A | | 1/1999 |
| JP | 2010160916 A | * | 7/2010 |
| JP | 2019-007546 A | | 1/2019 |
| JP | 2020-024826 A | | 2/2020 |
| WO | 2021/010433 A1 | | 1/2021 |
| WO | 2021/0104333 A1 | | 1/2021 |

OTHER PUBLICATIONS

International Search Report, International Application No. PCT/JP2022/001018, Date of mailing: Feb. 22, 2022, 2 pages.

* cited by examiner

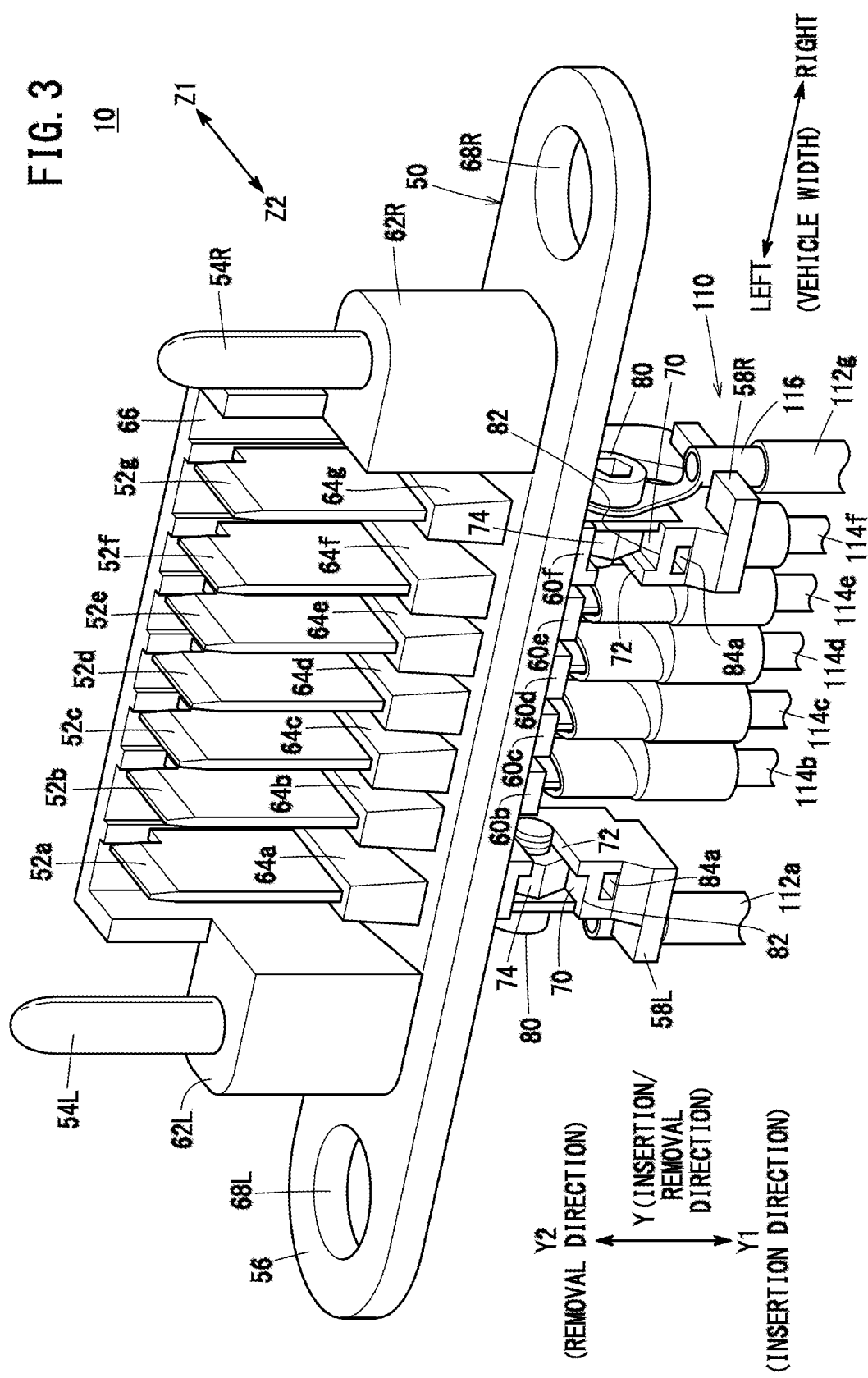

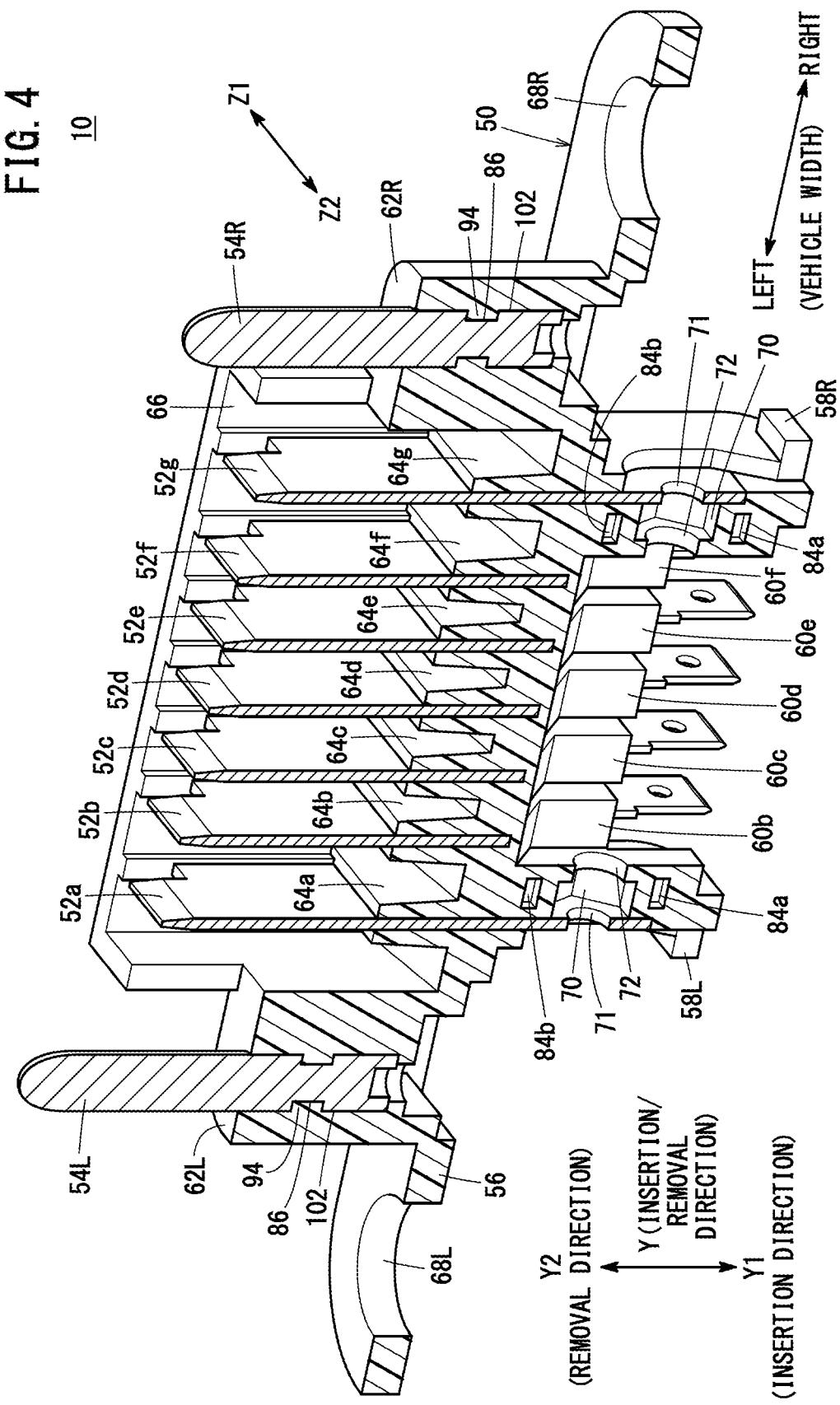

FIG. 6
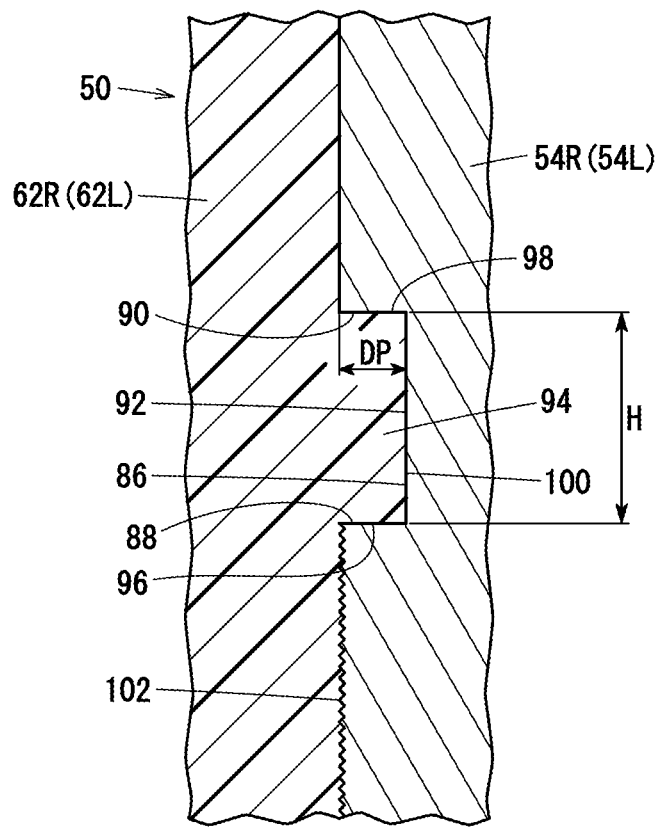
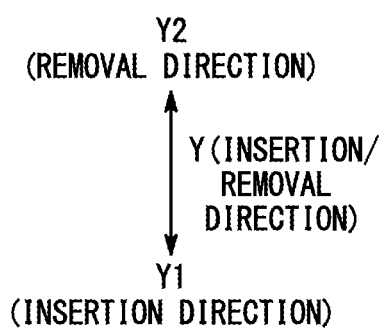

FIG. 10
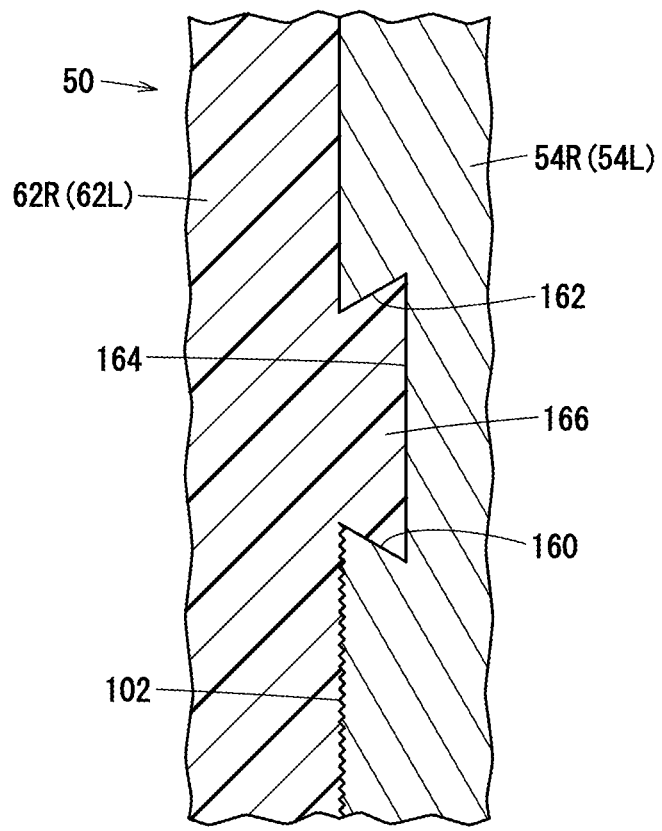
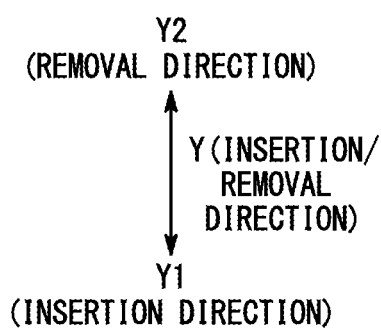

ELECTRICAL CONNECTOR

TECHNICAL FIELD

The present invention relates to an electrical connector to be electrically connected to a mating connector.

BACKGROUND ART

A male connector and a female connector are widely used as connectors for electrically connecting electrical devices to each other. The male connector includes a plurality of male terminals. The female connector includes a plurality of female terminals. When the male terminals are inserted into the female terminals, the electrical devices are electrically connected to each other. As a result, electric power, signals, and the like can be transmitted and received between the electrical devices.

In this type of connection structure, as described in JP 2020-024826 A, one of the male connector or the female connector may be provided with guide pins. In this case, guide holes are formed in the other of the male connector and the female connector. In this configuration, the guide pins are inserted into the guide holes before the male terminals are inserted into the female terminals. Thus, the male terminals and the female terminals are aligned with each other. Therefore, the male terminals can be easily guided toward the female terminals. In addition, the male terminals can be easily inserted into the female terminals after being guided.

SUMMARY OF THE INVENTION

When the male terminals are separated from the female terminals, a corresponding pulling force acts on the guide pins. At the same time, a force (falling force) in a direction in which the guide pins fall acts on the guide pins. In this situation, it is necessary to prevent the guide pins from coming off the terminals.

The present invention has the object of solving the aforementioned problem.

According to an embodiment of the present invention, there is provided an electrical connector including an electrical terminal to be electrically connected to a mating terminal provided in a mating connector, the electrical connector comprising: a base configured to support the electrical terminal; and a guide pin supported by the base and inserted into a guide hole formed in the mating connector, wherein a concave portion recessed toward an inside of the guide pin is formed in a side wall of the guide pin, and the base is embedded in the concave portion.

In the present invention, the concave portion is formed in the guide pin supported by the base. Further, the base is embedded in the concave portion. By this embedding, the guide pin is held by the base. Therefore, for example, when a pulling force or a falling force acts on the guide pin when the male terminal is separated from the female terminal, the guide pin is prevented from coming off the terminals.

BRIEF DESCRIPTION OF DRAWINGS

FIG. 3 is a schematic perspective view of the male connector shown in FIG. 1;

FIG. 4 is a schematic perspective cross-sectional view of the male connector;

FIG. 6 is a main part cross-sectional view of a guide pin and a first base (base) viewed from a direction orthogonal to an insertion/removal direction;

FIG. 10 is a main part cross-sectional view of a concave portion and a convex portion each having a shape different from that of FIG. 6, as viewed from the direction orthogonal to the insertion/removal direction.

DETAILED DESCRIPTION OF THE INVENTION

Hereinafter, a preferred embodiment of an electrical connector according to the present invention will be presented and described in detail with reference to the accompanying drawings. In the following description, "left", "right", "front", and "rear" respectively refer to the left side, the right side, the front side, and the rear side of a user seated on a seat 20 of an electric vehicle 12 shown in FIG. 1. Therefore, the "vehicle width direction" is synonymous with the "left-right direction". In addition, the lower side and the upper side indicate relative height positions and do not necessarily indicate the vertical direction.

Figure 1:
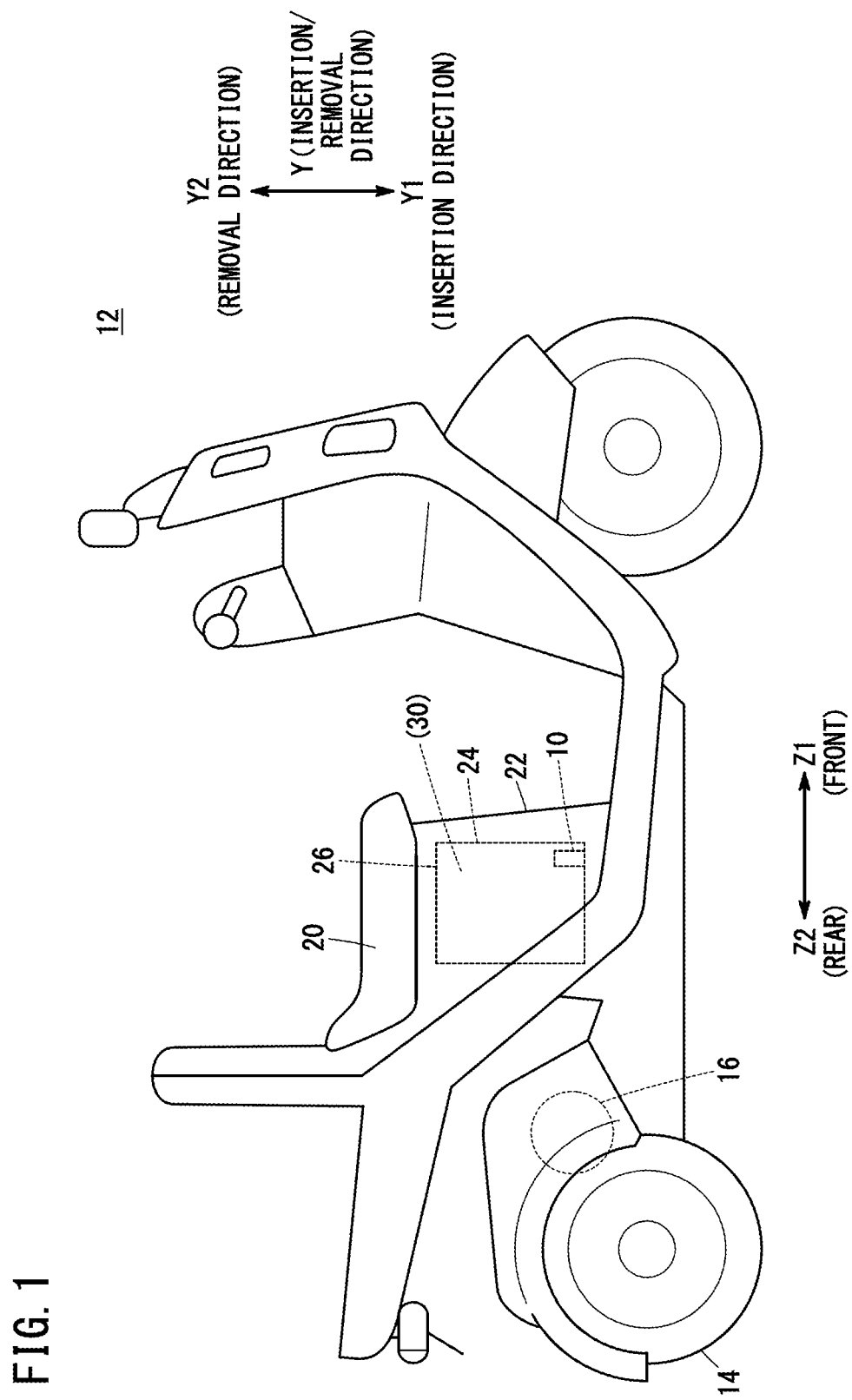
FIG. 1 is an overall schematic side view of an electric vehicle including a male connector serving as an electrical connector according to an embodiment of the present invention.

FIG. 1 is an overall schematic side view of the electric vehicle 12. The electric vehicle 12 includes a male connector 10 serving as an electrical connector. The electric vehicle 12 is a saddle-type electric three-wheeled vehicle. A drive motor 16 as a traveling drive power source is disposed in the vicinity of two rear wheels 14.

The electric vehicle 12 includes the seat 20 on which the user is seated, and a seat holding portion 22 that holds the seat 20. A battery pack housing portion 24 is formed inside the seat holding portion 22. The male connector 10 is disposed at the bottom part of the battery pack housing portion 24 so as to be close to the front side of the vehicle body. The male connector 10 extends in the vehicle width direction. The configuration of the male connector 10 will be described in detail later.

The seat 20 can be pivoted by a pivot shaft (not shown) provided on the front side of the vehicle body (in an arrow Z1 direction in FIG. 1). An opening 26 is provided on the upper part of the battery pack housing portion 24. When the seat 20 is pivoted in a direction in which the seat 20 is seated on the seat holding portion 22, the opening 26 is closed. The seat 20 seated on the seat holding portion 22 is locked by a lock mechanism (not shown). As a result, pivoting of the seat 20 is disabled.

When the lock mechanism is released and then the end portion of the seat 20 on the rear side of the vehicle body (in an arrow Z2 direction in FIG. 1) is pivoted in a direction away from the seat holding portion 22, the opening 26 of the battery pack housing portion 24 is opened. It becomes possible to house a battery pack 30 (see FIG. 2A and FIG. 2B) in the battery pack housing portion 24 through the opening 26 in the open state. It also becomes possible to remove the battery pack 30 from the battery pack housing portion 24. That is, the battery pack 30 is removably housed in the battery pack housing portion 24. By supplying electric power from the battery pack 30 to the drive motor 16, the electric vehicle 12 becomes able to travel.

Figure 2A:
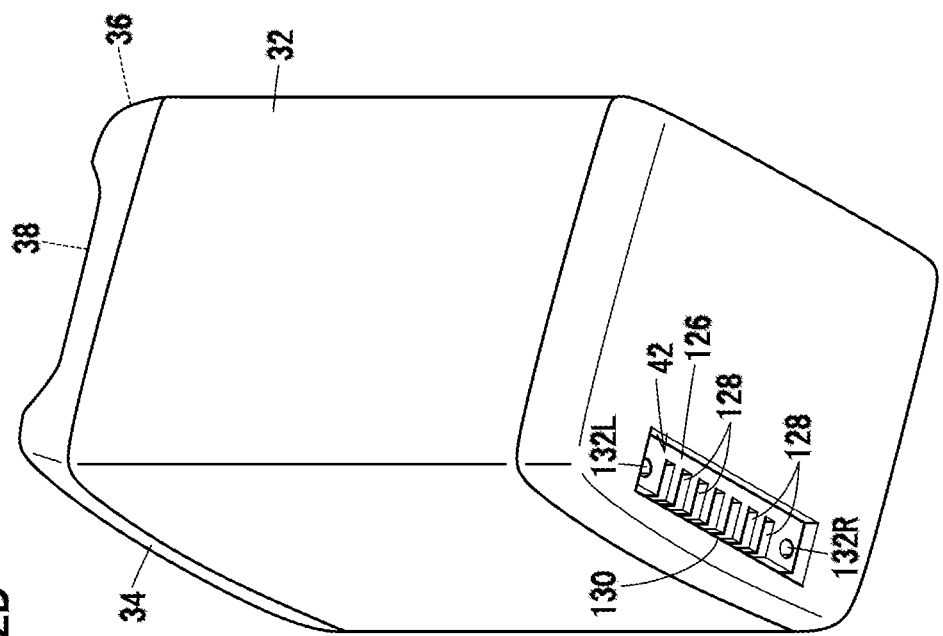
FIG. 2A is a schematic overall perspective view of a battery pack including a female connector serving as a mating connector electrically connected to the male connector of FIG. 1.
Figure 2B:
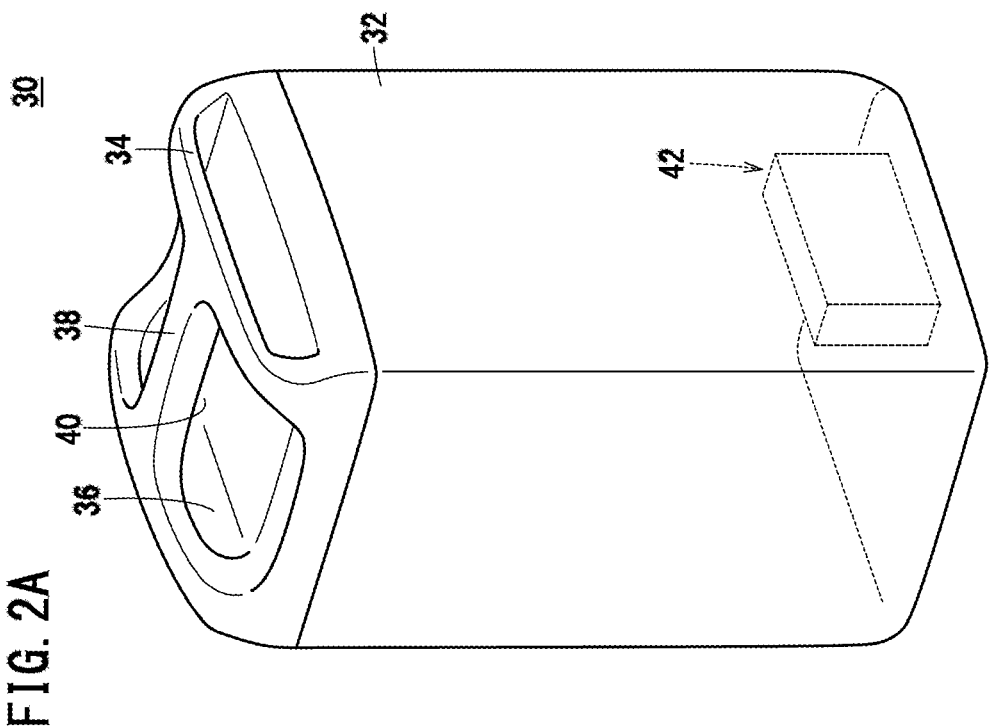
FIG. 2B is a schematic overall perspective view of the battery pack viewed from another direction.

Next, the battery pack 30 will be schematically described. FIG. 2A is a schematic overall perspective view of the battery pack 30 viewed from a predetermined direction. FIG. 2B is a schematic overall perspective view of the battery pack 30 viewed from another direction. The battery pack 30 includes a casing 32 having a substantially rectangular parallelepiped shape that is vertically long. When seen from above, the casing 32 has a substantially square shape or a substantially rectangular shape.

A battery core pack holding a plurality of unit cells is housed inside the casing 32. The unit cell is formed of, for example, a lithium secondary battery. When electric power is supplied to an external load, the capacity (power storage amount) of the secondary battery is reduced. Thereafter, the capacity of the secondary battery is recovered by receiving electric power supply from a charging device. In other words, the unit cells can be repeatedly charged and discharged. Since such a configuration of the battery pack 30 is known, a detailed description and illustration of the unit cells and the like will be omitted.

The upper surface of the casing 32 is provided with an arched portion 34 and a tab-shaped protruding portion 36. The arched portion 34 forms an arch shape by both end portions thereof in the longitudinal direction being bent to join the upper surface of the casing 32. The upper edge of the tab-shaped protruding portion 36 is curved in an arc shape. The arched portion 34 and the tab-shaped protruding portion 36 face each other. A bar-shaped gripping portion 38 extends from the upper end of the arched portion 34 to the upper end of the tab-shaped protruding portion 36. The upper ends of the arched portion 34 and the tab-shaped protruding portion 36 protrude from the upper surface of the casing 32. Therefore, the bar-shaped gripping portion 38 is separated from the upper surface of the casing 32. Accordingly, a clearance 40 is formed between the bar-shaped gripping portion 38 and the upper surface of the casing 32. The user can grip the bar-shaped gripping portion 38 by inserting his/her hand (fingers) into the clearance 40.

A female connector 42 serving as a mating connector is provided on the bottom surface of the casing 32. The female connector 42 is disposed close to the arched portion 34. The female connector 42 is electrically connected to the male connector 10 when the battery pack 30 is housed in the battery pack housing portion 24.

Next, the configurations of the male connector 10 and the female connector 42 will be described. FIG. 3 is a schematic perspective view of the male connector 10 serving as an electrical connector according to the present embodiment. FIG. 4 is a schematic perspective cross-sectional view of the male connector 10. The male connector 10 includes a first base 50, a plurality of (seven in the present embodiment) male terminals 52a to 52g, and a plurality of (two in the present embodiment) guide pins 54L and 54R.

The first base 50 is a single member integrally including a flange portion 56, two fixing tab portions 58L and 58R, five lower terminal-surrounding portions 60b to 60f, two pin support portions 62L and 62R, and seven upper terminal-surrounding portions 64a to 64g. The flange portion 56 extends in the vehicle width direction. The fixing tab portions 58L and 58R and the lower terminal-surrounding portions 60b to 60f protrude downward from the lower surface of the flange portion 56. The pin support portions 62L and 62R and the upper terminal-surrounding portions 64a to 64g protrude upward from the upper surface of the flange portion 56.

The first base 50 is provided with a thin support wall portion 66. The support wall portion 66 is positioned between portions of the left and right pin support portions 62L and 62R that face the front side of the vehicle body. The end surface of the support wall portion 66 that faces the rear side of the vehicle body is connected to the end surfaces of the upper terminal-surrounding portions 64a to 64g that face the front side of the vehicle body. The first base 50 is made of, for example, a thermoplastic resin and has insulating properties.

The direction (vehicle width direction) in which the male terminals 52a to 52g are arranged is the longitudinal direction of the flange portion 56. The flange portion 56 is a substantially track-shaped portion. Mounting holes 68L and 68R are respectively formed at both ends of the flange portion 56. Mounting screws (not shown) are passed through the mounting holes 68L and 68R. Screw holes (not shown) are formed in the bottom part of the battery pack housing portion 24 (see FIG. 1). The mounting screws are screwed into the screw holes. As a result, the male connector 10 is positioned and fixed in the battery pack housing portion 24.

The male terminals 52a to 52g are good conductors made of metal such as copper. In the male terminals 52b to 52f among these male terminals, the regions from the vicinity of the lower end portions thereof to the intermediate portions thereof in the height direction (the up-down direction of the vehicle body) are covered by the lower terminal-surrounding portions 60b to 60f and the upper terminal-surrounding portions 64b to 64g. In other words, both end portions of each of the five male terminals 52b to 52f in the longitudinal direction thereof are exposed from the first base 50, the longitudinal direction extending in the up-down direction of the vehicle body.

Figure 5:
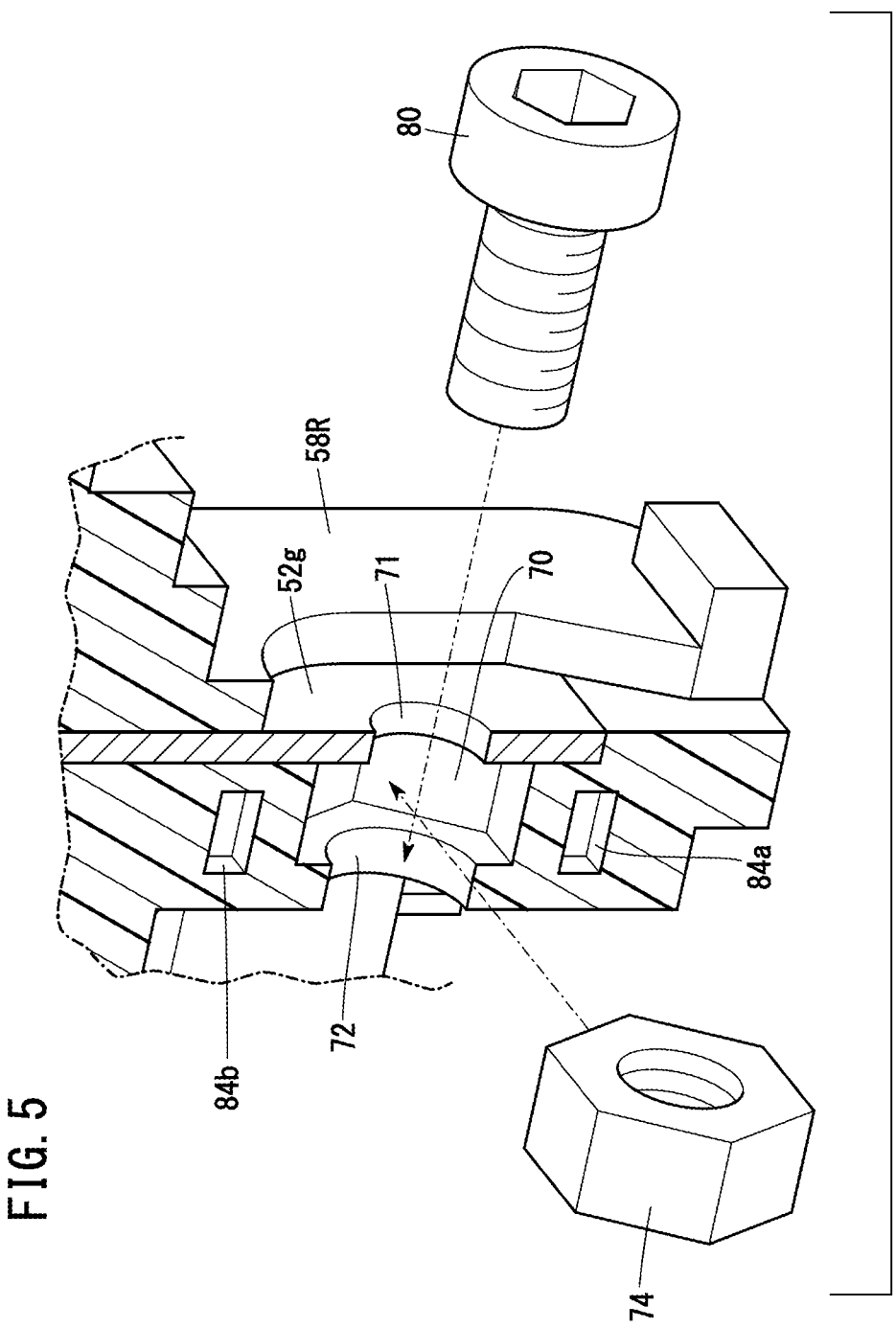
FIG. 5 is an enlarged view of a main part in FIG. 4.

On the other hand, the front part of the lower end portion of the male terminal 52a located at the left end is covered by the fixing tab portion 58L. As shown in FIG. 4, the rear part of the lower end portion of the male terminal 52a is exposed from the fixing tab portion 58L. A nut insertion hole 70 is formed in the fixing tab portion 58L. The rear part of the lower end portion of the male terminal 52a is adjacent to the nut insertion hole 70. Similarly, as shown in FIG. 5, the front part of the lower end portion of the male terminal 52g located at the right end is covered by the fixing tab portion 58R. The rear part of the lower end portion of the male terminal 52g is exposed from the fixing tab portion 58R. A nut insertion hole 70 is formed in the fixing tab portion 58R. The rear part of the lower end portion of the male terminal 52g is adjacent to the nut insertion hole 70.

Bolt insertion holes 71 are formed at the lower ends of the male terminals 52a and 52g. Further, bolt exposure holes 72 are formed on the inner side of the nut insertion holes 70 in the vehicle width direction. The bolt insertion hole 71, the nut insertion hole 70, and the bolt exposure hole 72 are connected to each other in the left-right direction of the vehicle body. The nut insertion holes 70 serve as housing holes for housing therein fixing nuts 74, and also serve as bolt holes through which fixing bolts 80 pass.

Window portions 82 (see FIG. 3) are open in the end surfaces of the fixing tab portions 58L and 58R that face the rear side of the vehicle body. The window portions 82 are connected to the nut insertion holes 70. Accordingly, the fixing tab portions 58L and 58R each have three open ends on the left side, the right side, and the rear side of the vehicle body.

A lower lightening portion 84a and an upper lightening portion 84b are formed in the vicinity of each window portion 82 and each nut insertion hole 70. The lower lightening portion 84a and the upper lightening portion 84b each have a substantially track shape extending in the vehicle-width direction. The lower lightening portion 84a and the upper lightening portion 84b are not connected to the window portion 82 or the nut insertion hole 70. The lower lightening portion 84a and the upper lightening portion 84b are recessed to a predetermined depth toward the front side of the vehicle body.

Lower end portions of the guide pins 54L and 54R are respectively embedded in the pin support portions 62L and 62R provided in the first base 50 (see FIG. 4 in particular). Upper ends of the guide pins 54L and 54R extend upward from the pin support portions 62L and 62R, respectively. The pin support portions 62L and 62R are provided at positions sandwiching the seven upper terminal-surrounding portions 64a to 64g. Therefore, the male terminals 52a to 52g are sandwiched between the guide pins 54L and 54R.

As shown in FIGS. 4 and 6, each of the guide pins 54L and 54R is provided with an annular concave portion 86 (a concave portion) having an annular groove shape extending along and around the side peripheral wall. The annular concave portion 86 is recessed toward the inside of each of the guide pins 54L and 54R. The annular concave portion 86 includes a concave lower surface 88 located on the lower side, a concave upper surface 90 located on the upper side, and a concave peripheral surface 92 (an insertion/removal direction surface) located between the concave lower surface 88 and the concave upper surface 90. On the other hand, a flange-shaped convex portion 94 that protrudes toward the annular concave portion 86 is formed on the first base 50. The flange-shaped convex portion 94 includes a convex lower surface 96 contacting the concave lower surface 88, a convex upper surface 98 contacting the concave upper surface 90, and a convex peripheral surface 100 surrounding the concave peripheral surface 92. The concave lower surface 88 corresponds to a recessed side surface, and the convex lower surface 96 corresponds to a covering surface. The flange-shaped convex portion 94 is embedded in the annular concave portion 86, and the convex lower surface 96 covers the concave lower surface 88, whereby the guide pins 54L and 54R are held by the pin support portions 62L and 62R. Further, the guide pins 54L and 54R are prevented from coming off from the pin support portions 62L and 62R. This feature will be described later.

FIG. 6 shows a cross section of each of the guide pins 54L and 54R viewed from a direction orthogonal to an insertion/removal direction Y described later. As shown in FIG. 6, in the present embodiment, a height H of the annular concave portion 86 is greater than a depth DP of the annular concave portion 86. In other words, the length of the concave peripheral surface 92 from the concave lower surface 88 to the concave upper surface 90 (the height H) is greater than the length of each of the concave lower surface 88 and the concave upper surface 90 from an opening of the annular concave portion 86 to the concave peripheral surface 92 (the depth DP).

A knurling 102 is preferably applied to at least any of the concave lower surface 88, the concave upper surface 90, the concave peripheral surface 92, and the side peripheral walls of the guide pins 54L and 54R. In the illustrated example, the knurling 102 is applied to the side peripheral wall of each of the guide pins 54L and 54R.

The male connector 10 including the first base 50, the male terminals 52a to 52g, and the guide pins 54L and 54R can be manufactured by, for example, molding. Specifically, the male terminals 52a to 52g and the guide pins 54L and 54R are accommodated in a cavity of a mold in advance. After closing the mold, a melt of a thermoplastic resin is injected into the cavity. When the melt is cooled and hardened after a predetermined time has elapsed, the first base 50 made of the thermoplastic resin is obtained.

As shown in FIG. 3, a harness 110 is attached to the male terminals 52a to 52g. The harness 110 is a bundle in which two power lines 112a and 112g and five signal transmission lines 114b to 114f are bundled. The power lines 112a and 112g are electrically connected to the lower end portions of the male terminals 52a and 52g, respectively. The signal transmission lines 114b to 114f are electrically connected to the lower end portions of the male terminals 52b to 52f, respectively.

The male terminal 52g and the power line 112g are connected to each other via the fixing bolt 80 and the fixing nut 74. To be specific, a crimp terminal 116 having a round hole is attached to the tip of the power line 112g. Further, the fixing nut 74 is inserted into the nut insertion hole 70. The shank of the fixing bolt 80 is passed through the round hole and the bolt insertion hole 71 of the male terminal 52g. Furthermore, a threaded portion provided on the side wall of the shank is screwed into a threaded portion provided on the inner peripheral wall of the fixing nut 74. By this screwing, the crimp terminal 116 comes into close contact with the lower end portion of the male terminal 52g. The shank of the fixing bolt 80 is exposed from the bolt exposure hole 72 of the fixing tab portion 58R.

The positional relationship between the fixing tab portion 58L and the male terminal 52a is mirror-symmetrical to the positional relationship between the fixing tab portion 58R and the male terminal 52g. Therefore, in the fixing tab portion 58L and the male terminal 52a, the same components as those of the fixing tab portion 58R and the male terminal 52g are denoted by the same reference numerals, and detailed description thereof will be omitted.

Figure 7:
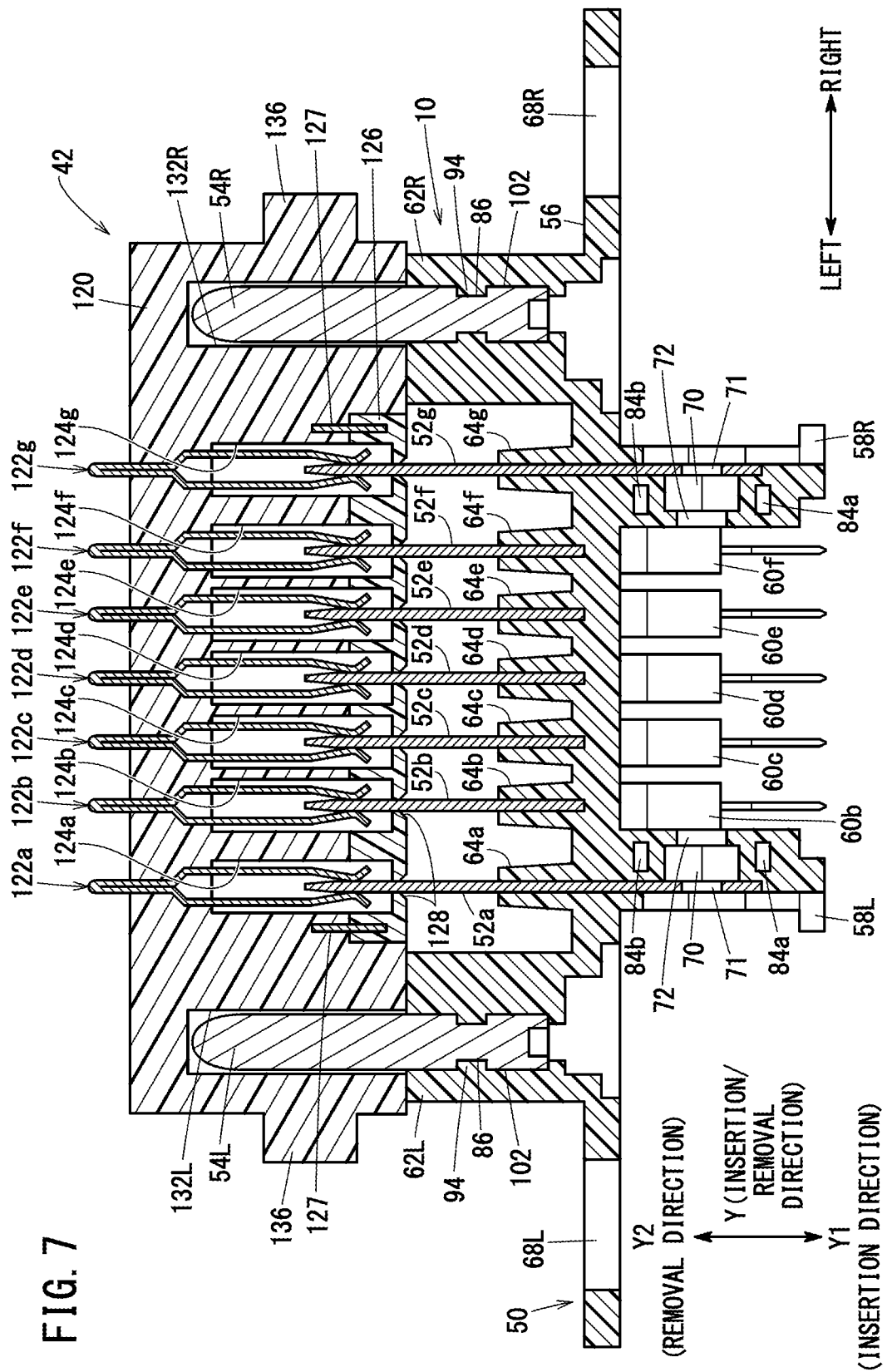
FIG. 7 is a main part longitudinal cross-sectional view showing a state in which the male connector of FIG. 1 and the female connector of FIG. 2B are connected to each other.

As shown in FIG. 7, the female connector 42 provided in the battery pack 30 includes a second base 120 and seven female terminals 122a to 122g. The female terminals 122a to 122g are supported by the second base 120. The second base 120 is, for example, an insulator made of an insulating thermoplastic resin or the like. The female terminals 122a to 122g are good conductors made of metal such as copper, for example.

Figure 8:
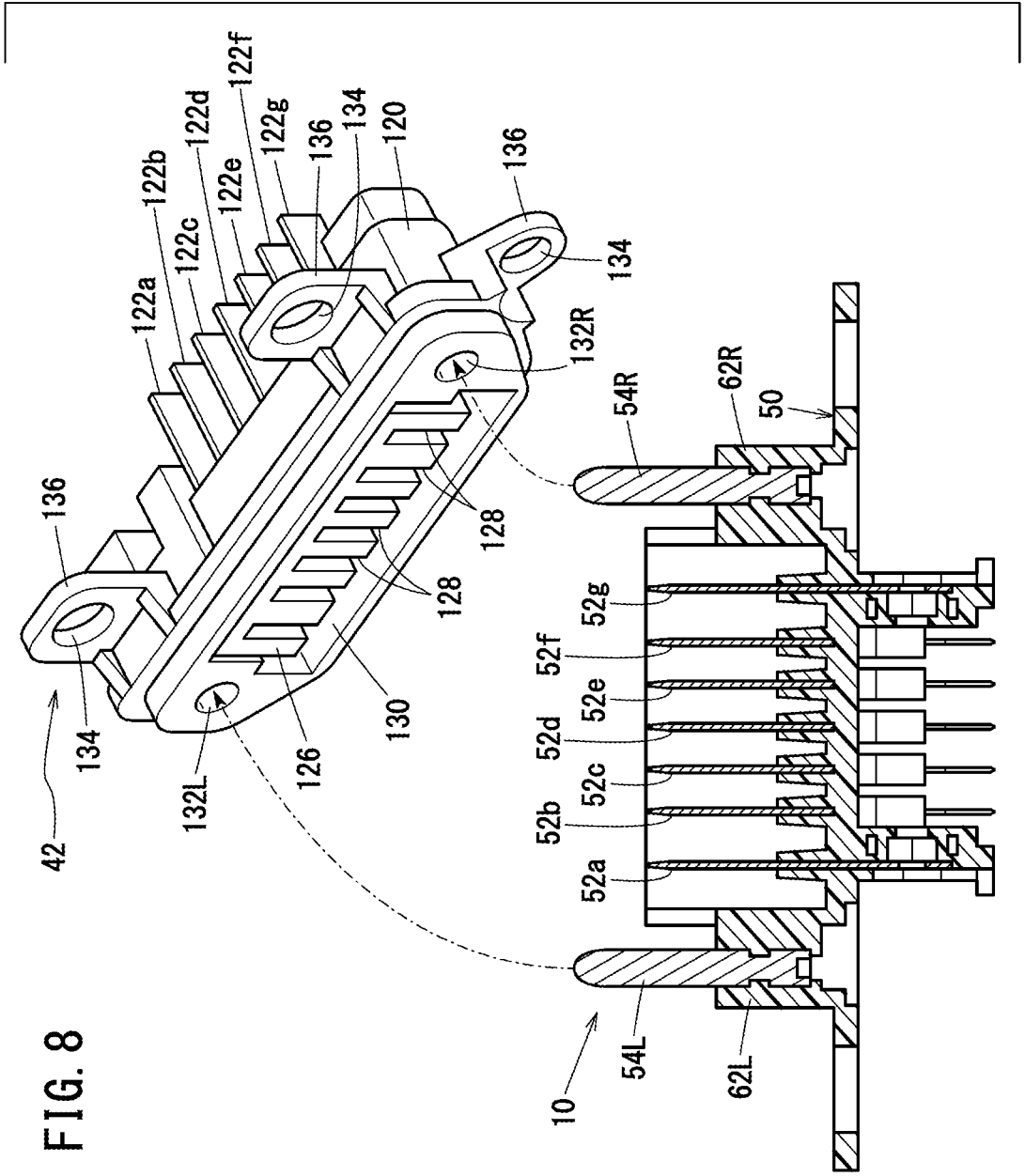
FIG. 8 is a main part exploded view showing a state in which the male connector and the female connector are separated from each other from the state in FIG. 7.

The second base 120 is provided with seven housing holes 124a to 124g extending upward from the lower surface thereof. The housing holes 124a to 124g are linearly arranged in parallel in the longitudinal direction of the second base 120 (in this case, the horizontal direction parallel to the arched portion 34 and the vehicle-width direction). Further, as shown in FIGS. 7 and 8, a cover member 126 is attached to the lower surface of the second base 120 via two coupling pins 127. The cover member 126 extends from the housing hole 124a to the housing hole 124g. A plurality of insertion holes 128 are formed in the cover member 126. Each insertion hole 128 has a substantially rectangular shape. The plurality of insertion holes 128 are connected to the housing holes 124a to 124g, respectively. An insertion groove 130 for inserting the support wall portion 66 is formed between the second base 120 and the cover member 126.

Two guide holes 132L and 132R are open in the lower surface of the second base 120. The guide holes 132L and 132R are formed at positions sandwiching the seven housing holes 124a to 124g. As will be described later, the battery pack 30 is positioned and fixed by the guide pins 54L and 54R being inserted into the guide holes 132L and 132R.

As shown in FIG. 8, tab portions 136 are formed to protrude from both side surfaces of the second base 120. A screw insertion hole 134 is formed in each of the tab portions 136. A screw (not shown) for attaching the second base 120 to the casing 32 is passed through the screw insertion hole 134.

The female terminals 122a to 122g are held by the second base 120. Each of the female terminals 122a to 122g includes two terminal plates. The male terminals 52a to 52g are respectively inserted between the lower ends of the two terminal plates of the female terminals 122a to 122g. The upper ends of the two terminal plates are joined to each other and protrude from the second base 120. The protruding upper ends serve as electrical contacts for the unit cells in the casing 32. Note that the female terminals 122a and 122g are power transmission terminals for transmitting electric power between the unit cells and an external load (or a charging device). Therefore, power lines (not shown) are electrically connected to the upper ends of the female terminals 122a and 122g. The female terminals 122b to 122f are signal transmission terminals for transmitting signals between the unit cells and the external load (or the charging device). Therefore, signal transmission lines (not shown) are electrically connected to the upper ends of the female terminals 122b to 122f.

Next, the operation and effect of the male connector 10 will be described.

Figure 9:
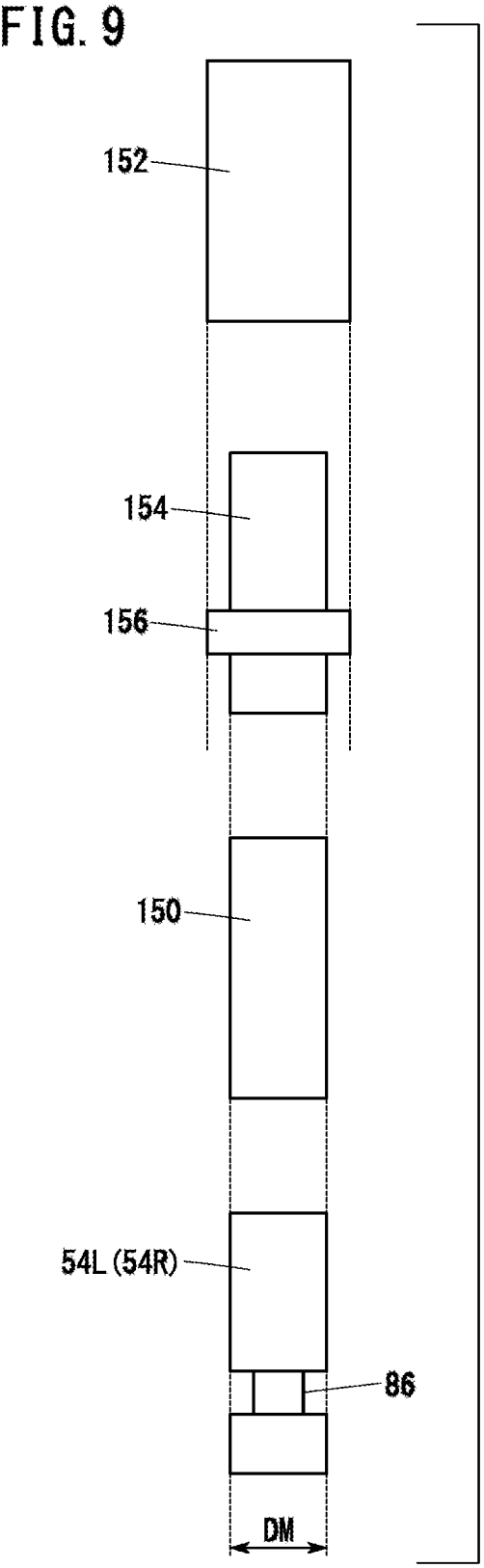
FIG. 9 is a schematic flow showing a process of manufacturing the guide pin and a flanged guide pin from round bars having different diameters.

As shown in the lower part of FIG. 9, the annular concave portion 86 of each of the guide pins 54L and 54R is formed by cutting or grinding a round bar 150. Specifically, by cutting the side peripheral wall of the round bar 150 along the circumferential direction, the annular concave portion 86 including the three surfaces, namely, the concave lower surface 88, the concave upper surface 90, and the concave peripheral surface 92 (see FIG. 6) is formed. Thereafter, the upper end side is tapered. In addition, preferably, the knurling 102 is applied to at least any of the concave lower surface 88, the concave upper surface 90, the concave peripheral surface 92, and the side peripheral wall. In this manner, the guide pins 54L and 54R are manufactured.

The upper part of FIG. 9 shows a case where a flanged guide pin 154 is manufactured from a round bar 152. A diameter DM of the flanged guide pin 154 is equal to the diameters of the guide pins 54L and 54R. Further, the flanged guide pin 154 includes a so-called outer flange 156. The diameter of the round bar 152 is reduced by cutting or grinding a majority portion of the side peripheral wall thereof. On the other hand, the portion that has not been subjected to cutting or grinding is not reduced in diameter. This portion serves as the outer flange 156 that protrudes relative to the side peripheral wall having the reduced diameter. In this manner, the flanged guide pin 154 is manufactured.

As understood from FIG. 9, the round bar 150 for obtaining each of the guide pins 54L and 54R provided with the annular concave portion 86 has a smaller diameter than the round bar 152 for obtaining the flanged guide pin 154 including the outer flange 156. In addition, the amount of cutting for obtaining each of the guide pins 54L and 54R from the round bar 150 is smaller than the amount of cutting for obtaining the flanged guide pin 154 from the round bar 152. That is, when the male connector 10 is obtained by employing the guide pins 54L and 54R, resource saving can be achieved as compared with the case where the flanged guide pin 154 is employed. Further, since the amount of cutting is reduced, there is also an advantage that the time required for machining is shortened.

In order to obtain the male connector 10, first, the guide pins 54L and 54R manufactured as described above and the male terminals 52a to 52g are accommodated in a cavity of a mold. After closing the mold, a melt of a thermoplastic resin is injected into the cavity. At this time, a part of the melt enters the annular concave portions 86 formed in the guide pins 54L and 54R (see FIG. 6). In the present embodiment, the length of the concave peripheral surface 92 from the concave lower surface 88 to the concave upper surface 90 (the height H of the annular concave portion 86) is set to be greater than the length of each of the concave lower surface 88 and the concave upper surface 90 from the opening of the annular concave portion 86 to the concave peripheral surface 92 (the depth DP of the annular concave portion 86). In this case, it becomes particularly easy for the melt to enter the annular concave portions 86.

When the melt is cooled and hardened after a predetermined time has elapsed, the first base 50 made of a thermoplastic resin and having insulating properties is formed. As a result, the male connector 10 in which the guide pins 54L and 54R and the male terminals 52a to 52g are supported by the first base 50 is obtained. In the first base 50, the flange-shaped convex portions 94 embedded (or fitted) in the annular concave portions 86 are formed. Since the melt can easily enter the annular concave portions 86 as described above, the flange-shaped convex portions 94 can also be easily obtained. The flange-shaped convex portions 94 each include the convex lower surface 96, the convex upper surface 98, and the convex peripheral surface 100 that contact the concave lower surface 88, the concave upper surface 90, and the concave peripheral surface 92, respectively. Further, the wall portion of the first base 50 bites into the surface to which the knurling 102 is applied.

The male connector 10 thus obtained is positioned and fixed to the bottom part of the battery pack housing portion 24 (see FIG. 1) via the mounting screws passed through the mounting holes 68L and 68R of the flange portion 56. Further, as shown in FIG. 3, the signal transmission lines 114b to 114f are electrically connected to the lower end portions of the male terminals 52b to 52f, respectively.

Furthermore, the power line 112a is electrically connected to the male terminal 52a, and the power line 112g is electrically connected to the male terminal 52g. Specifically, the fixing bolts 80 are passed through the round holes of the crimp terminals 116 and the bolt insertion holes 71 of the male terminals 52a and 52g. The fixing nuts 74 are inserted in advance into the nut insertion holes 70 formed in the fixing tab portions 58L and 58R. The threaded portions of the fixing bolts 80 are screwed into the fixing nuts 74 (see FIG. 5). By this screwing, the crimp terminals 116 come into close contact with the lower end portions of the male terminals 52a and 52g.

As shown in FIGS. 3 to 5, the lower lightening portions 84a and the upper lightening portions 84b formed in the vicinity of the nut insertion holes 70 are not connected to the window portions 82 or the nut insertion holes 70. In this case, the rigidity of the fixing tab portions 58L and 58R becomes greater than that of a fixing tab portion in which the lower lightening portion 84a and the upper lightening portion 84b are connected to the window portion 82 or the nut insertion hole 70. Therefore, the strength of the first base 50 is also increased. Accordingly, the fixing nuts 74 can be firmly held.

When the battery pack 30 is housed in the battery pack housing portion 24, the user releases the lock mechanism. Thereafter, the user pivots the end portion of the seat 20 on the rear side of the vehicle body (in the arrow Z2 direction in FIG. 1) in a direction away from the seat holding portion 22. With this pivoting, the opening 26 of the battery pack housing portion 24 is opened.

Further, the user inserts his/her hand (fingers) into the clearance 40 of the battery pack 30 to grip the bar-shaped gripping portion 38. Thereafter, the user lifts the battery pack 30 and brings the battery pack 30 into such a posture that the female connector 42 is aligned with the male connector 10. Then, the user inserts the bottom part of the battery pack 30 into the opening 26. In this state, the user slowly inserts the battery pack 30 into the battery pack housing portion 24. In the present embodiment, an arrow Y1 direction shown in FIG. 1 and the like is the insertion direction.

As the battery pack 30 is inserted into the battery pack housing portion 24, first, the upper ends of the guide pins 54L and 54R enter the guide holes 132L and 132R, respectively. Thereafter, the male connector 10 and the female connector 42 are aligned with each other by the guide pins 54L and 54R being guided by the guide holes 132L and 132R, respectively. Further, when the guide pins 54L and 54R are inserted into the guide holes 132L and 132R to predetermined depths, respectively, the battery pack 30 is positioned and fixed at a predetermined position in the battery pack housing portion 24.

When the guide pins 54L and 54R are guided by the guide holes 132L and 132R, respectively, the support wall portion 66 is inserted into the insertion groove 130 (see FIG. 8). Further, the male terminals 52a to 52g are inserted into the insertion holes 128 of the cover member 126 and the housing holes 124a to 124g of the second base 120. Furthermore, the male terminals 52a to 52g are respectively inserted between the lower ends of the two terminals plates of the female terminals 122a to 122g (see FIG. 7). During the insertion, the lower ends of the terminal plates are slightly separated in a direction away from each other by elastic action. As a result, each of the male terminals 52a to 52g is sandwiched and held between the two terminal plates. By this sandwiching and holding, electrical contacts between the male terminals 52a to 52g and the female terminals 122a to 122g are formed.

The user pivots the end portion of the seat 20 on the rear side of the vehicle body (in the arrow Z2 direction in FIG. 1) in a direction approaching the seat holding portion 22. As a result, the opening 26 of the battery pack housing portion 24 is closed by the seat 20. Further, the user operates the lock mechanism to disable pivoting of the seat 20. In this manner, preparation for driving the electric vehicle 12 to a desired point is completed. When the user drives the electric vehicle 12, electric power of the battery pack 30 is transmitted to the electric vehicle 12 (in particular, the drive motor 16) via the female terminals 122a and 122g and the male terminals 52a and 52g. In addition, information relating to the residual capacity and the like of the battery pack 30 is transmitted to the electric vehicle 12 via the female terminals 122b to 122f and the male terminals 52b to 52f.

When the user recognizes that "the battery pack 30 needs to be replaced" based on the residual capacity displayed on the electric vehicle 12, the user drives the electric vehicle 12 to the charging station and stops the drive motor 16. Thereafter, in the same manner as described above, the user opens the opening 26 of the battery pack housing portion 24, grips and pulls up the bar-shaped gripping portion 38 of the battery pack 30, and separates the battery pack 30 from the battery pack housing portion 24.

That is, in this case, an arrow Y2 direction opposite to the insertion direction Y1 is the removal direction. Therefore, the concave lower surface 88 of the annular concave portion 86 is a recessed side surface facing the removal direction Y2 (see FIG. 6). The convex lower surface 96 of the flange-shaped convex portion 94 is a covering surface that is located further in the removal direction Y2 than the concave lower surface 88 and that faces the insertion direction Y1. Hereinafter, the insertion direction Y1 and the removal direction Y2 may be collectively referred to as an "insertion/removal direction Y".

With the above-described pulling up, a pulling force in the removal direction Y2 or a falling force in a direction in which the guide pins 54L and 54R fall acts on the guide pins 54L and 54R. However, the annular concave portions 86 are formed in the guide pins 54L and 54R, and the flange-shaped convex portions 94 of the first base 50 are fitted in the annular concave portions 86. Specifically, the convex lower surfaces 96 serving as the covering surfaces cover the concave lower surfaces 88 serving as the recessed side surfaces. Therefore, the flange-shaped convex portions 94 serve to prevent the guide pins 54L and 54R from coming off. For this reason, the guide pins 54L and 54R are prevented from coming off the pin support portions 62L and 62R (the first base 50).

In addition, the wall portions of the first base 50 bite into the portions of the guide pins 54L and 54R to which the knurling 102 is applied. An anchor effect is obtained by this biting. Moreover, frictional resistance is generated between the portions to which the knurling 102 is applied and the first base 50. Based on the above, the guide pins 54L and 54R are more effectively prevented from coming off the first base 50.

As described above, according to the present embodiment, it is possible to save resources and shorten the machining time in the process of obtaining the guide pins 54L and 54R from the round bars 150. In addition, it is possible to prevent the guide pins 54L and 54R from coming off the first base 50.

The pulling force from the female terminals 122a and 122g also acts on the male terminals 52a and 52g inserted into the female terminals 122a and 122g, respectively. Therefore, the male terminals 52a and 52g are pulled in the removal direction Y2. Further, with this pulling, the fixing nuts 74 in the nut insertion holes 70 of the fixing tab portions 58L and 58R are pulled in the removal direction Y2.

In the present embodiment, the strength of the first base 50 is sufficiently high. This is because, as described above, the lower lightening portions 84a and the upper lightening portions 84b are not connected to the window portions 82 or the nut insertion holes 70. Accordingly, the first base 50 can firmly hold the fixing nuts 74. Therefore, the power lines 112a and 112g are prevented from coming off the male terminals 52a and 52g. In addition, the male terminals 52a and 52g are prevented from coming off the first base 50.

Note that the present invention is not limited to the above disclosure, and various modifications are possible without departing from the essence and gist of the present invention.

For example, the concave portion formed in each of the guide pins 54L and 54R is not limited to the annular concave portion 86 that extends along and around the side peripheral wall. The concave portion may be, for example, one or a plurality of bottomed holes or through holes.

In FIGS. 4 and 6, the annular concave portion 86 having an annular groove shape and including the concave lower surface 88 and the concave upper surface 90 orthogonal to the insertion/removal direction Y is illustrated as the concave portion. On the other hand, as shown in FIG. 10, a reverse-inclined concave portion 164 having a substantially trapezoidal shape may be formed. In this case, a first inclined surface 160 and a second inclined surface 162 appear in a cross section taken along the insertion/removal direction Y. The first inclined surface 160 is inclined with respect to the insertion/removal direction Y, and is inclined in the insertion direction Y1 as the first inclined surface 160 extends toward the inside of each of the guide pins 54L and 54R. The second inclined surface 162 (an inclined surface) is inclined with respect to the insertion/removal direction Y, and is inclined in the removal direction Y2 as the second inclined surface 162 extends toward the inside of each of the guide pins 54L and 54R, contrary to the first inclined surface 160. That is, the reverse-inclined concave portion 164 becomes wider toward the inside.

In this case, an undercut convex portion 166 having a shape corresponding to the shape of the reverse-inclined concave portion 164 is formed on the first base 50. By the undercut convex portions 166 being embedded in the reverse-inclined concave portions 164, the guide pins 54L and 54R are prevented from coming off the pin support portions 62L and 62R (the first base 50), respectively. Since the second inclined surface 162 is inclined in the removal direction Y2, it is difficult for the undercut convex portion 166 to be separated from the reverse-inclined concave portion 164. Therefore, the guide pins 54L and 54R can be firmly held by the pin support portions 62L and 62R.

For example, the male connector 10 may be provided in an electric device other than the electric vehicle 12, such as a power generation device that generates electric power using electric power of the battery pack 30, or a charging device that charges the battery pack 30.

Contrary to the above embodiment, the guide pins 54L and 54R may be provided on the female connector 42. In this case, the guide holes 132R and 132L are formed in the male connector 10.

The invention claimed is:

1. An electrical connector including an electrical terminal to be electrically connected to a mating terminal provided in a mating connector, the electrical connector comprising:
   a base configured to support the electrical terminal; and
   a guide pin supported by the base and inserted into a guide hole formed in the mating connector, wherein
   a concave portion recessed toward an inside of the guide pin is formed in a side wall of the guide pin,
   the base is embedded in the concave portion,
   when a direction in which the electrical terminal is separated from the mating terminal is defined as a removal direction, a direction which is opposite to the removal direction and in which one of the electrical terminal or the mating terminal is inserted into another one of the electrical terminal or the mating terminal is defined as an insertion direction, and the removal direction and the insertion direction are collectively defined as an insertion/removal direction, the concave portion includes an inclined surface inclined with respect to the insertion/removal direction, and
   the inclined surface is inclined in the removal direction as the inclined surface extends toward an inside of the guide pin.

2. The electrical connector according to claim 1, wherein the concave portion includes an insertion/removal direction surface parallel to the insertion/removal direction, and
   when a cross section of the concave portion taken along the insertion/removal direction is viewed from a direction orthogonal to the insertion/removal direction, the insertion/removal direction surface is longer than other surfaces of the concave portion.

3. The electrical connector according to claim 1, wherein a knurling is applied to at least one of a plurality of inner surfaces of the concave portion, or a side wall of the guide pin.

4. An electrical connector including an electrical terminal to be electrically connected to a mating terminal provided in a mating connector, the electrical connector comprising:
   a base configured to support the electrical terminal; and
   a guide pin supported by the base and inserted into a guide hole formed in the mating connector, wherein
   a concave portion recessed toward an inside of the guide pin is formed in a side wall of the guide pin,
   the base is embedded in the concave portion,
   when a direction in which the electrical terminal is separated from the mating terminal is defined as a removal direction, a direction which is opposite to the removal direction and in which one of the electrical terminal or the mating terminal is inserted into another one of the electrical terminal or the mating terminal is defined as an insertion direction, and the removal direction and the insertion direction are collectively defined as an insertion/removal direction, the concave portion includes a recessed side surface that is orthogonal to the insertion/removal direction and faces the removal direction,
   a portion of the base that is embedded in the concave portion includes a covering surface that is located further in the removal direction than the recessed side surface and that faces the insertion direction,
   the covering surface covers the recessed side surface,
   the concave portion includes an insertion/removal direction surface parallel to the insertion/removal direction, and
   when a cross section of the concave portion taken along the insertion/removal direction is viewed from a direction orthogonal to the insertion/removal direction, the insertion/removal direction surface is longer than other surfaces of the concave portion.

5. The electrical connector according to claim 4, wherein a knurling is applied to at least one of a plurality of inner surfaces of the concave portion, or a side wall of the guide pin.

6. An electrical connector including an electrical terminal to be electrically connected to a mating terminal provided in a mating connector, the electrical connector comprising:
   a base configured to support the electrical terminal; and
   a guide pin supported by the base and inserted into a guide hole formed in the mating connector, wherein
   a concave portion recessed toward an inside of the guide pin is formed in a side wall of the guide pin,
   the base is embedded in the concave portion, the base is provided with a bolt hole through which a bolt configured to connect a harness to the electrical terminal passes and which houses a nut being screwed onto the bolt, the base is provided with a lightening portion in a vicinity of the bolt hole, and the lightening portion is separated from the bolt hole.

7. The electrical connector according to claim 6, wherein the lightening portion is track-shaped.

* * * * *